Patented Mar. 12, 1940

2,193,165

UNITED STATES PATENT OFFICE 2,193,165

CITRATES OF PROCAINE AND METHOD FOR THEIR PRODUCTION

David Curtis, New York, N. Y.

No Drawing. Application June 11, 1935,
Serial No. 26,037

7 Claims. (Cl. 260—472)

The present invention relates to citrate salts of procaine and to new and improved local anaesthetics in which such citrates of procaine are incorporated as the active anaesthetic ingredients.

Heretofore local anaesthetics, particularly those intended for hypodermic injections, were formed by using in solution procaine hydrochloride, a vaso-constrictor such as epinephrine hydrochloride or any other acid salt of epinephrine, an anti-oxidant and physiological salt. Such an anaesthetic solution, containing these acid ingredients, formed a highly acid anaesthetic generally incompatible with the tissues of the injected area which are of a naturally alkaline reaction, particularly as the vaso-constrictor would block off the injected area from the blood stream and prevent the natural buffers in the blood from counteracting the acidity of the anaesthetic.

I have found that the citrates of procaine, because they are procaine salts of a weak acid, hydrolize to a large extent and liberate more of the procaine base, and therefore tend to have a reaction considerably less acid than the hydrochloride of procaine, making the anaesthetic solution of citrate of procaine more agreeable to the tissue cells. This factor of procaine citrate hydrolizing in aqueous solution and this liberating more of the base also tends to render the anaesthetic solution more potent in its action, in accordance with the principle laid down by Oscar Gros (Arch. Expt. Path. Pharm., v. 63, pp. 80–106, and v. 67, pp. 132–136, Leipzig).

Furthermore, the citrates of procaine, when introduced into the tissues, react in such a manner that the citric acid radicle liberated through the abstraction of the procaine base by the nerve cells, is neutralized by the alkaline substances naturally present in the blood and the tissues, such as the sodium bicarbonate and the di-sodium hydrogen phosphate, to form alkaline salts of citrates, thus not depriving the anaesthetized area of its alkaline reserve, thereby preventing post anaesthetic pain that may result from the use of inorganic acid procaine salts.

This property of citrates of procaine is not affected by the pH of the solution, so that if an anti-oxidant is added which may lower the pH value of the solution, it will not affect the formation of alkaline citrates in the tissues.

In preparing the citrate salts of procaine base, I have found that three different citrates of procaine are available and may be produced: the mono-procaine citrate, the di-procaine citrate and the tri-procaine citrate. For convenience I shall hereinafter refer to these salts as mono-citricaine, di-citricaine and tri-citricaine, respectively.

In a general way the citricaines may be prepared by bringing citric acid and procaine base in close contact in a suitable solvent in which both procaine base and citric acid are soluble or in which the citric acid alone is soluble. In the latter case the procaine base, though not itself dissolved initially, combines gradually with the citric acid to form a soluble salt. Of the first type of solvent, acetone, ethyl acetate and alcohol have been successfully used. Of the latter solvents, water is a very useful example. Where water is used, heat hastens the chemical union between the reactants. The salts produced may be left in the original solution and so used, or may be separated from the solution in the appropriate manner for the particular solvent employed.

Mono-citricaine-mono-diethyl amino ethanol-para-amino benzoate—oxytricarbollilate, having a structural formula of

[C$_6$H$_4$.NH$_2$.COO.C$_2$H$_4$N(C$_2$H$_5$)$_2$]COOH-
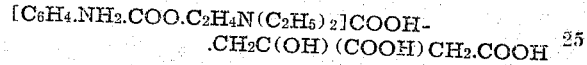

is a white crystalline powder having a molecular weight of 428.11 and a M. P. of 130–131° C., capillary method. It may be made by bringing into contact, in equimolecular proportions, citric acid, anhydrous, and procaine base, in a suitable solvent and stirring. A 2% solution of mono-citricaine shows a pH of 4.2 (methyl red as indicator and LaMotte chart color comparator). The pH of this solution does not change upon the addition of the usual small amount of epinephrine solution such as 1:35,000 as base, often employed in conjunction with local anaesthetics.

Di-citricaine-di-diethyl amino ethanol-para-amino benzoate—oxytricarbollilate, having a structural formula of 2[C$_6$H$_4$.NH$_2$.COO.C$_2$H$_4$N(C$_2$H$_5$)$_2$]COOH-
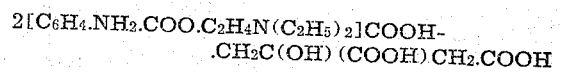

is a white crystalline powder having a molecular weight of 664.11, being a combination of two molecules of procaine base and one molecule of citric acid, anhydrous. It has a M. P. of 120–121° C., capillary method. A 2% solution of di-citricaine, with or without the addition of epinephrine solution, shows a pH of 5.1 (tested as above). Di-citricaine may be prepared by bringing into contact, in a suitable solvent, two molecular equivalents of procaine base and one molecular equivalent of citric acid, anhydrous.

Tri-citricaine,- tri-diethyl amino ethanol-para-amino benzoate—oxytricarbollilate, having a structural formula of

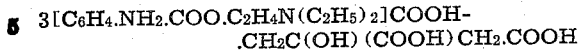

is a white crystalline powder of a molecular weight of 900.11, representing the combination of three molecules of procaine base and one molecule of citric acid anhydrous. The anhydrous salt has a melting point of 118–119° C., capillary method. A 2% solution of tri-citricaine has a pH of 6.9 to 7.0, and is alkaline to litmus paper. The addition of epinephrine solution does not materially affect the pH.

Tri-citricaine may be prepared by bringing into contact, in a suitable solvent, procaine base and citric acid, anhydrous, in proportion of three molecular equivalents of procaine base to one molecular equivalent of citric acid, anhydrous, and stirring.

It may here be stated that hydrous citric acid having one molecule of water of crystallization may be used in the preparation of all the citricaines. Allowance, however, must then be made for the water in the molecular weights computations.

A highly convenient method of preparation of any of the three citricaines in aqueous solution, ready for immediate use, is to dissolve the calculated amounts of citric acid in a convenient volume of distilled water, bringing the solution to a boil, adding the calculated molecular proportion of procaine base, bringing the solution to a boil again, removing the container from the flame and stirring the liquid continuously until the solution becomes clear, denoting the completion of the reaction.

After the reaction is completed the solution may be adjusted to the desired concentration required and other ingredients necessary to complete the anaesthetic solution may be added. If the final solution is to contain physiological salt, it may be added and dissolved simultaneously with the citric acid.

While an anaesthetic solution having a low hydrogen ion concentration (a relatively high pH value) is desirable because of its greater compatibility with the pH of the tissue cells, it has been found incompatible with the stability of the anaesthetic solution, which of necessity contains a vaso constrictor, usually an acid salt of epinephrine. The reason is that the epinephrine decomposes through oxidation in solution, its rate of decomposition, which is shown by discoloration, being accelerated by any increase in pH value.

I have found, however, that epinephrine solutions are more stable in the presence of citricaines than in the presence of inorganic acid salts of procaine, notably the hydrochlorides; so that in any solution of a citricaine of a definite pH value, the epinephrine salt will decompose less rapidly than in a solution of the same pH value containing an inorganic acid salt of procaine. Thus an anaesthetic solution containing a citricaine will stand up longer and remain without discoloration for a longer period of time than a corresponding anaesthetic solution containing an inorganic acid salt of procaine.

Because of these two qualities of compatibility and retarding effect on epinephrine discoloration possessed by the citricaines in different proportions and degrees, depending on the acidity of their respective solutions, it is possible to prepare mixtures of the mono-, di- and tri-procaine citrates in such varying proportions as to obtain solutions of different, relatively high pH values, and which, when epinephrine salts are added to them, stand up without discoloration for a substantial length of time.

For example, a 2% solution of tri-citricaine, having a pH value of 6.9 to 7.0 and being alkaline to litmus paper, when combined with a solution of epinephrine, 1:35,000 base, either in the form of hydrochloride, tartrate or citrate, will remain free from discoloration for about twelve hours.

By using a 2% solution of citricaine composed of 10% of di-citricaine and 90% of tri-citricaine by weight, plus epinephrine solution, the combination registered a pH value of 6.5, was likewise alkaline to litmus paper and remained free from discoloration for 17 hours.

A 2% solution containing ⅓ by weight of di-citricaine and ⅔ by weight of tri-citricaine, plus epinephrine solution, had a pH value of 5.9 to 6.00 and was barely acid to litmus and remained colorless for more than twenty-four hours.

A 2% solution containing 50% di-citricaine and 50% tri-citricaine, by weight, plus epinephrine solution, had a pH of 5.7 and retained freedom from discoloration for a much longer period of time.

These mixtures, representing valuable compounds of local anaesthetics between the critical acid value of the blood (pH 5.6) and neutrality (pH 7.0), represent important characteristics of the citricaines and are especially useful and valuable for use in clinics and hospitals and by individual practitioners who do not use stock solutions but prepare their anaesthetics as required from the powder or tablets containing epinephrine or to which epinephrine is added in solution form. While heretofore such anaesthetic solutions prepared from procaine hydrochloride would discolor rapidly, resulting in waste and frequent necessity of renewals of freshly made solutions during the daily operative routine, it is now possible by using powders or tablets of the citricaines, and especially the tri-citricaine, which is the most desirable for its relatively high pH value in solution, to prepare local anaesthetic solutions which will stand up without discoloration for at least a full operative routine day of twelve hours.

In putting up commercial solutions of local anaesthetics of the citricaines, where stability of long periods of time is an essential factor, and particularly in the case of the tri-citricaine, the customary anti-oxidants such as sodium sulphite ($Na_2SO_3$), or sodium bisulphite ($NaHSO_3$) are added. The former anti-oxidant, which has an alkaline reaction in fresh solution, when added to a 2% solution of tri-citricaine containing the usual amount of epinephrine, registers a pH value of 7.1 and is definitely alkaline to litmus. The latter anti-oxidant, when added to a similar solution, registers a pH value of 6.5 and is less alkaline to litmus paper.

The fact that the sodium sulphite and the sodium bisulphite tend in time, through hydrolysis or oxidation, to turn more acid and to reduce the pH value of the solution, does not impair to any great extent the compatibility of the anaesthetic solution with the tissue cells because of the characteristic of the citricaines to form alkaline substances within the tissues, as explained above.

The enumerated citricaines may be treated in solution with sodium bicarbonate or sodium alkaline phosphate to form alkaline solutions having additional therapeutic values, such as mild surface anaesthetics for mucous tissue, etc.

The citrates of procaine may also be used in combination with epinephrine substitutes in case where the use of epinephrine is precluded for any reason. The epinephrine substitutes enumerated below retain their stability and freedom from discoloration in combination with any of the citricaines, including the tri-citricaine, which has a high pH value in solution, for long periods of time, even without the use of anti-oxidants. These epinephrine substitutes, which are milder vaso-constrictors than epinephrine, whose use in local anaesthetics is indicated in such conditions as high blood pressure, heart trouble, age and diabetes, and the like, are: ephedrine sulphate, ephedrine benzoate, synthetic racemic ephedrine hydrochloride, para-hydroxy-phenyl-ethyl-amine-hydrochloride and other compounds belonging to the epinephrine group.

While the foregoing is a general description of the citricaines and the methods of their preparation and their combination with one another and with other substances in the preparation of local anaesthetics and other therapeutic products, I do not wish to be limited to the few specific examples set forth, as, obviously, many more combinations may be obtained, within the scope of the present invention and without the use of the inventive faculties.

What I claim as my invention is:

1. As a new chemical compound the tri- diethyl amino ethanol-para-amino benzoate -citrate, having the formula $$3[C_6H_4.NH_2.COO.C_2H_4N(C_2H_5)_2].COOH.CH_2.C(OH)(COOH)CH_2.COOH.$$

2. The method of preparing citrates of procaine which comprises the steps of dissolving citric acid in water, boiling up the solution, adding procaine base, bringing the solution to a boil, and then stirring the liquid until solution of the procaine is effected.

3. The method of preparing citrates of procaine which comprises the steps of bringing procaine base and citric acid in a solvent for citric acid or for both citric acid and procaine base, stirring to effect chemical union between the reactants.

4. The method of preparing citrates of procaine which comprises the steps of bringing into contact procaine base and citric acid in a solvent for citric acid or for both citric acid and procaine base, stirring to effect chemical union and separating the resultant product from the solvent.

5. As a new composition of matter, a citric acid salt of diethyl-amino-ethanol-para-amino-benzoate.

6. The method for preparing a solution of citric acid salts of procaine which comprises the steps of dissolving citric acid and procaine base in a suitable solvent, the citric acid and procaine base being present in an amount of substantially not more than three molecular equivalents of procaine base to one molecular equivalent of citric acid.

7. The method for preparing a solution of tri-procaine citrate which comprises the steps of dissolving one molecular equivalent of citric acid with substantially three molecular equivalents of procaine base in a suitable solvent.

DAVID CURTIS.